United States Patent [19]
Boll

[11] Patent Number: 5,327,992
[45] Date of Patent: Jul. 12, 1994

[54] METHOD FOR CONTROLLING A HYBRID DRIVE WHICH DRIVES A VEHICLE

[75] Inventor: Wolf Boll, Weinstadt, Fed. Rep. of Germany

[73] Assignee: Mercedes-Benz AG, Fed. Rep. of Germany

[21] Appl. No.: 53,262

[22] Filed: Apr. 28, 1993

[30] Foreign Application Priority Data

May 28, 1992 [DE] Fed. Rep. of Germany ....... 4217668

[51] Int. Cl.⁵ .............................................. B60K 6/04
[52] U.S. Cl. ................................. 180/65.2; 180/65.4; 290/45; 290/50
[58] Field of Search .................... 180/65.2, 65.3, 65.4, 180/65.6, 65.7, 65.8; 290/45, 50

[56] References Cited

U.S. PATENT DOCUMENTS

| | | | |
|---|---|---|---|
| 3,791,473 | 2/1974 | Rosen | 180/65.2 |
| 4,021,677 | 5/1977 | Rosen et al. | 180/65.2 |
| 4,305,254 | 12/1981 | Kawakatsu et al. | 180/65.2 |
| 4,335,429 | 6/1982 | Kawakatsu | 364/424 |
| 4,407,132 | 10/1983 | Kawakatsu et al. | 60/716 |
| 5,081,365 | 1/1992 | Field et al. | 290/45 |
| 5,117,931 | 6/1992 | Nishida | 180/65.2 |

FOREIGN PATENT DOCUMENTS

| | | |
|---|---|---|
| 2501386 | 7/1976 | Fed. Rep. of Germany. |
| 2465884 | 3/1981 | France. |
| WO91/08919 | 6/1991 | World Int. Prop. O.. |

Primary Examiner—Margaret A. Focarino
Assistant Examiner—Peter English

[57] ABSTRACT

A method for controlling a hybrid drive consisting of an internal combustion engine and at least one electric motor which can be driven via an electrical energy source, in which the electric motor can be operated as a generator when required. In order to reduce the fuel consumption and the emission of noxious substances of the internal combustion engine in those operating ranges in which the torque to be output by the internal combustion engine to overcome the instantaneous tractive resistances lies below a torque corresponding to ideal operation of the internal combustion engine with respect to efficiency and/or exhaust gas behavior, the internal combustion engine is operated essentially with the torque corresponding to ideal operation. The differential torque between the torque corresponding to ideal operation and the torque to be output by the internal combustion engine to overcome the instantaneous tractive resistances is used to drive the electric motor which is switched as a generator.

16 Claims, 2 Drawing Sheets

METHOD FOR CONTROLLING A HYBRID DRIVE WHICH DRIVES A VEHICLE

BACKGROUND AND SUMMARY OF THE INVENTION

The present invention relates to a method for controlling a hybrid drive which includes an internal combustion engine and at least one electric motor which can be driven via an electrical energy source, and drives a vehicle and in which the electric motor is switched over to generator mode when a preset requirement to generate electricity is present.

German Patent Document DE-OS 25 01 386 discloses a method of the above-described type, in which the electric motor which is provided to drive the vehicle operates when required as a generator driven by the internal combustion engine in order to produce current, for example for charging up the battery feeding the electric motor.

An object of the present invention is to provide a method of the initially described type in which the fuel consumption of the internal combustion engine and its emission of noxious substances are further reduced.

This and other objects are achieved by the present invention which provides a method for controlling a hybrid drive that drives a vehicle, the hybrid drive including an internal combustion engine and at least one electric motor which can be driven via an electrical energy source. The method comprises the steps of switching the electric motor over to a generator mode when a preset requirement to generate electric energy is present, and operating the internal combustion engine substantially at a torque corresponding to ideal operation of the internal combustion engine with respect to at least one of efficiency and exhaust gas behavior when the internal combustion engine is in operating ranges in which an amount of torque to be output by the internal combustion engine for overcoming instantaneous tractive resistances lies below a torque corresponding to the ideal operation of the internal combustion engine. A differential torque between the torque corresponding to the ideal operation and the torque to be output by the internal combustion engine for overcoming the instantaneous tractive resistances is used to drive the electric motor operated as a generator.

Using the method according to the invention, it is achieved that whenever the vehicle is being driven via the internal combustion engine and there is a need to generate electric energy, for example to charge up a battery which is supplying energy for the electric motor or for other electrical loads, the internal combustion engine can be operated over wide ranges always in an operating range which is most favorable with respect to the specific fuel consumption and/or with respect to the emission of noxious substances. The taking up of the torque of the electric motor running in generator mode is controlled in this process in such a way that the precise difference between the torque output by the internal combustion engine in these load ranges and the torque required to overcome the instantaneous tractive resistances, provided this difference is greater than zero, is taken up by the generator to generate electric energy. Both the storage of the electric energy required to operate the electric motor and the drive of the vehicle via the internal combustion engine can thus be achieved in these operating ranges with optimum efficiency and/or with minimum emission of noxious substances.

In certain embodiments of the present invention, the control of the hybrid drive takes place according to a characteristic diagram. This has the advantage that the most varied parameters can be taken into account for the control of the internal combustion engine and of the generator so that changes in individual operating parameters and ambient parameters can be reacted to as quickly as possible.

In certain embodiments of the invention, a battery is coupled to the electric motor and is an energy source to drive the electric motor. The take-up of the torque of the electric motor operating in the generator mode is controlled to a set value which is greater than the torque corresponding to ideal operation, whenever the battery is discharged to a severe degree. With these embodiments, it remains ensured that in the event of the generation of a high electric energy being required briefly, for example when the battery is discharged to a severe extent and a plurality of electrical loads are switched on at the same time, this required electric energy can be provided as quickly as possible.

Other objects, advantages and novel features of the present invention will become apparent from the following detailed description of the invention when considered in conjunction with the accompanying drawings.

DETAILED DESCRIPTION OF THE DRAWINGS

Figure 1:
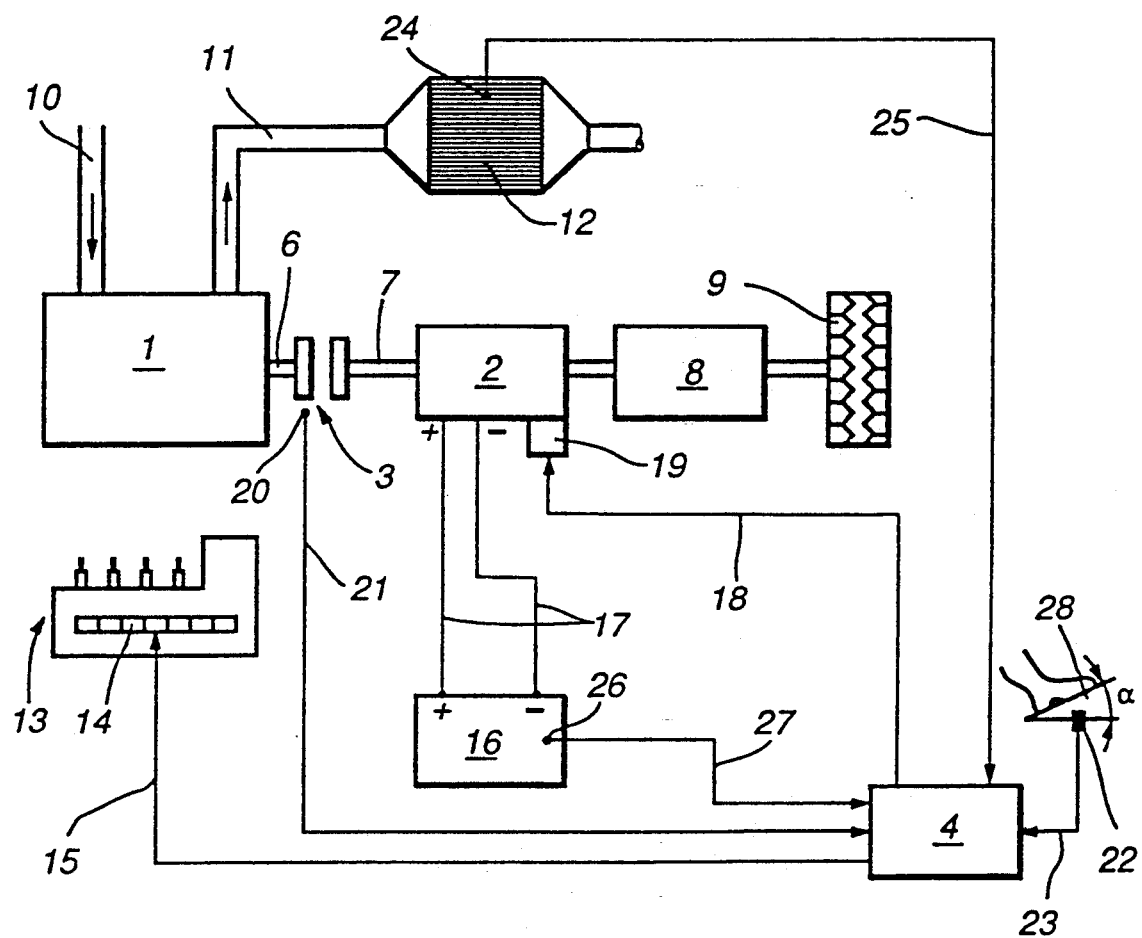
FIG. 1 shows a basic illustration of a device for carrying out the method according to the invention.

FIG. 1 shows a hybrid drive for a motor vehicle. This drive comprises a diesel engine i and an electric motor 2. A hydraulically actuable disconnect-type clutch 3 is arranged in the power train between the diesel engine 1 and the electric motor 2. In the engaged state of the clutch 3, the crankshaft 6 of the diesel engine i is non-rotatably connected to the input shaft 7 of the electric motor 2. The power take-off of the electric motor 2 is non-rotatably connected to the input shaft of a conventional multispeed gearbox 8 of the vehicle. The power take-off of the gearbox 8 acts via a differential gear (not illustrated in the drawing for the sake of clarity) on the drive axle or on the drive wheels 9 of the vehicle.

The diesel engine i has an intake line 10 and an exhaust gas line 11, with a soot particle filter 12 being arranged in the exhaust gas line 11 in order to reduce the emission of soot particles. Fuel is injected via a known fuel injection pump 13 whose actuation element (control rod 14), which determines the amount of fuel injected, can also be actuated by the electronic control unit 4 via the control line 15.

In addition, an electrical energy source in the form of a battery 16 is provided which, when the electric motor 2 is intended to drive the vehicle alone or together with the diesel engine 1, provides the electric energy necessary for this driving. The electric motor 2 can also be operated as a generator which is driven in this operating mode (the "generating mode") with the clutch 3 engaged by the diesel engine 1. In the generating mode, the electric motor 2 produces current which is fed via the lines 17 and a device (not illustrated in the drawing) for controlling charge current into the battery 16. The size of the torque which is taken up by the generator 2 in this operating mode is determined via a controller 19 which is also actuated by the electronic control unit 4 via the control line 18. The electronic control unit 4 is fed: 1) a signal which corresponds to the current speed n of the diesel engine 1 via a sensor 20 and a measured value line 21; 2) a signal which corresponds to the current load setting $\alpha$ (deflection $\alpha$ of the accelerator pedal 28) via a sensor 22 and a measured value line 23; 3) a signal corresponding to the current temperature T of the soot filter body 12 via the sensor 24 and a measured value line 25; and 4) a signal corresponding to the current charge state of the battery 16 via a sensor 26 and a measured value line 27.

The hybrid drive can be operated in the following four basic modes (a)-(d).

In mode (a), the vehicle is driven exclusively by the diesel engine 1. In this mode, the disconnect-type coupling 3 is engaged, but the electric motor 2 is inactive. This means that no additional driving torque is supplied by the electric motor 2. The electric motor 2 is actuated via the controller 19 in such a way that no driving torque whatsoever is tapped off from the diesel engine 1 to generate electric energy.

In mode (b), the vehicle is driven exclusively by the electric motor 2. In this mode, the disconnect-type coupling 3 is open, i.e. the diesel engine 1 is separated from the electric motor 2. The electric motor 2 draws from the battery 16 via the accelerator pedal 28 (accelerator pedal position $\alpha$) the appropriate energy required by the driver for driving the vehicle. With an opened disconnect-type coupling 3, the diesel engine 1 is generally switched off.

In mode (c), the vehicle is driven by the diesel engine 1 and the electric motor 2. In this mode, the clutch 3 is also engaged (closed). Depending on the instantaneous gear ratio and load setting, the driving torque to be produced to drive the vehicle is provided partially by the diesel engine 1 and partially by the electric motor 2. This mode of operation is selected predominantly on accelerating and, furthermore, is necessary to obtain free charge capacity in the battery for the subsequently described operating mode (d).

In mode (d), the vehicle is driven by the diesel engine 1 and the electric motor 2 operates in generator mode, i.e. a portion of the driving torque produced by the diesel engine 1 is taken up, with the clutch 3 engaged, by the electric motor 2 which is now operating in generator mode in order to generate a torque of load for the diesel engine 1. The electric motor 2 is configured in such a way that it is able to take up in generator mode approximately up to half the torque output by the diesel engine 1.

All four operating modes (a)-(d) have in common that the electric motor 2 can act as a generator in a thrust mode of the vehicle.

Figure 2:
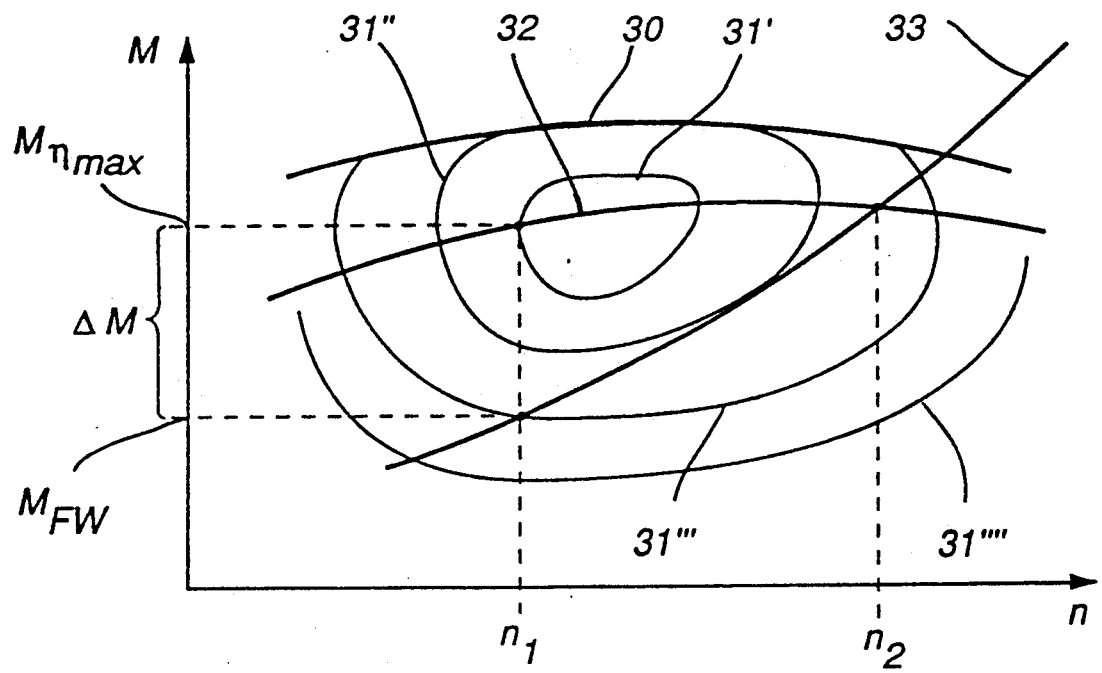
FIG. 2 shows a first exemplary embodiment of the method according to the invention in a diagram $M = f(n)$.

The electric motor 1 is operated as a generator (operating mode (d)) if the electronic control unit 4 is signalled via the sensor 26 that the battery 16 is discharged beyond a specific degree, in other words, if there is a need to generate electric energy via the electric motor and to feed this energy into the battery 16. The diagram in FIG. 2 shows the interrelation between the torque M (ordinate) output by the diesel engine 1 and the respective engine speed n (abscissa). The magnitude of the torque M here is a direct measure of the quantity of fuel injected.

The line 30 characterizes the variation of the torque under full load, that is to say when the amount of fuel injected is at a maximum. At 31', 31'', 31''' and 31'''', curves of constant specific fuel consumption or constant efficiency are illustrated. Of these, the curve 31' is the curve with the greatest efficiency and 31'''' is the curve with the smallest efficiency.

The curve 32 represents that variation of the torque along which the maximum efficiency, with respect to the respective engine speed n, is always given. It can be seen that this curve 32 extends in relatively high load ranges.

By contrast 33 constitutes that curve which, in the event that the vehicle is driven exclusively via the diesel engine 1, represents the torque which has to be produced by the diesel engine 1 in order to overcome the instantaneous tractive resistances in a specific gear. It can be seen that below the engine speed $n_2$ the torque to be provided by the diesel engine 1 to overcome the tractive resistances (curve 33) is smaller than the torque which is output by the diesel engine 1 whenever the engine is operated in the range of maximum efficiency (curve 32). According to the present invention, there is provision to allow the electric motor 2 to operate in generator mode and to operate the diesel engine 1 along the curve 32 in the engine speed range below the engine speed $n_2$ whenever the electronic control unit 4 is signalled via sensor 26 that the charge state of the battery 16 is below a predetermined limit value. The diesel engine 1 produces a higher torque up to the engine speed $n_2$ than is required to overcome the tractive resistances. The electric motor 2 is actuated via the controller 19 in such a way that precisely the differential torque $\Delta M$ (illustrated in FIG. 2 at a speed $n_1$) between the torque $Mn_{max}$ corresponding to the ideal operation and the torque $M_{FW}$ to be output by the diesel engine 1 in order to overcome the instantaneous tractive resistances is always taken up by the electric motor 2, running in generator mode, for the purpose of producing current or for charging the battery 16. In this way, the operation of the diesel engine 1, and thus also the generation of current for charging the battery 16 always can take place at optimum efficiency in this phase. Moreover, by virtue of the fact that the diesel engine 1 is always operated in a relatively high load range during this phase, an exhaust gas temperature predominately exists which lies above the limit temperature required for automatic regeneration of the soot filter 12. The soot filter 12 is thus prevented from clogging up.

If the battery 16 is discharged to a very severe degree, the control provides for the diesel engine 1 to be operated briefly above the curve 32.

Should the battery 16 be completely charged, that is to say should generation of current not be required, no further torque is taken up by the electric motor 2. The vehicle can then be driven again by means of one of the three drive modes (a), (b) or (c), as required. In this case, the electronic control unit 4 can for example ensure that, in the interim, current is consumed by the operating mode (b) or (c) so that the soot filter 12 is regularly burnt free by the mode (d).

Figure 3:
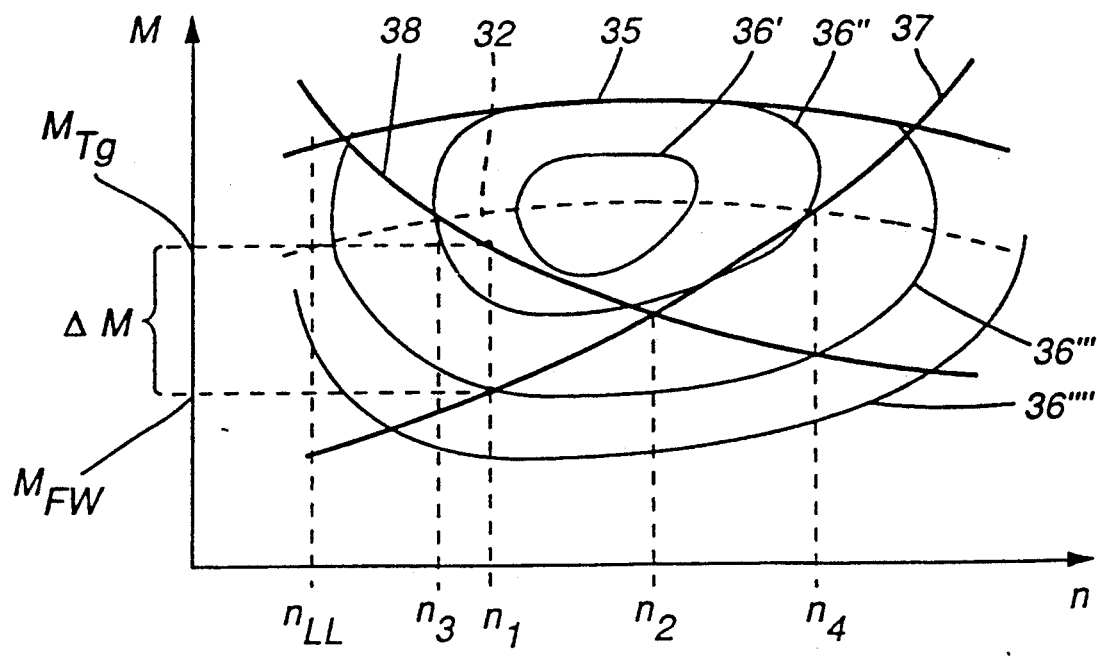
FIG. 3 shows a further exemplary embodiment of the method according to the invention in a diagram $M = f(n)$.

The soot particle filter 12 can also be prevented from clogging during the phase in which the electric motor 2 is operating in generator mode if the diesel engine 1 and the electric motor 2 are controlled in accordance with the characteristic line according to FIG. 3. Like FIG. 2, the diagram in FIG. 3 shows the interrelation between the torque M (ordinate) output by the diesel engine 1 and its speed n (abscissa). The curve 35 in turn represents the full-load characteristic line. The lines 36'-36"" describe curves of constant specific fuel consumption or constant efficiency, analogously with FIG. 2, 36' representing here the curve with the greater efficiency and 36"" representing the curve with the smaller efficiency. In this diagram, curve 37 also designates the tractive resistances to be overcome by the diesel engine 1 in a specific gear. However, curve 38 characterizes a limit line above which an automatic regeneration (automatically occurring burning off) of the soot filter 12 is possible. Therefore, if the internal combustion engine is always operated at an operating point above the limit line 38, the filter 12 is prevented from clogging. In contrast, when the diesel engine 1 is operated below this limit line 38, the exhaust gas temperature is so low that automatic regeneration of the filter 12 cannot occur and the filter consequently clogs up. Below the limit speed n2, the torque (curve 37) to be supplied by the diesel engine 1 to overcome the instantaneous tractive resistances lies below that torque (curve 38) starting from which a sufficiently high exhaust gas temperature for automatic regeneration of the filter 12 is ensured. Accordingly, the present invention actuates the electric motor 2 via the electronic control unit 4 and the controller 19 in such a way that precisely the differential torque $\Delta M$ (illustrated in FIG. 3 at a random speed $n_1$, $n_1 < n_2$) between the torque $M_{Tg}$ (curve 38) corresponding to the ideal operation and the torque $M_{FW}$ (curve 37) to be output by the diesel engine 1 to overcome the instantaneous tractive resistances is always taken up by the electric motor 2 operating in generator mode in order to generate current or to charge up the battery 16.

In addition, the curve 32 which has already been explained in greater detail with respect to FIG. 2 and shows the variation of the torque at which the diesel engine i is operated at the maximum degree of efficiency is illustrated in FIG. 3. It can be seen that the curve 38 is at a higher position than the curve 32 between the idling speed $n_{LL}$ and the speed $n_3$. This means that in this region, when the diesel engine 1 is only operated along the optimum efficiency curve 32, the exhaust gas temperature is not sufficiently high to be able to ensure the automatic regeneration of the filter 12. Therefore, in a further embodiment of the invention, the diesel engine 1 is operated along the characteristic line 38 or above it as far as the speed $n_3$ so that the exhaust gas temperature required for automatic regeneration of the filter 12 is also given here. Above this speed $n_3$ up to the speed $n_4$, starting from which the curve 37 is located above the curve 32, the diesel engine i is then operated along the characteristic line 32 provided this is possible in view of the charge capacity of the battery. Thus, it is not only ensured above this speed $n_3$ that the diesel engine 1 is operated at maximum efficiency but also that the exhaust gas temperature is always so high that the filter 12 can regenerate itself. The differential torque between the torque (curve 37) required to overcome the tractive resistances and the torque corresponding to ideal operation, here the curve 38 between $n_{LL}$ and $n_3$ and the curve 32 above $n_3$, is also taken up here according to the invention by the electric motor 2 operating in the generator mode in order to generate current to charge up the battery 16.

The electronic control unit 4 can monitor and control the burning-off process in such a way that operating states may briefly occur in which a burning-off temperature is not present in the soot filter 12, in particular in the region between $n_{LL}$ and $n_3$ with a view to saving fuel. Likewise, the electronic control unit can pursue other control priorities (optimization of consumption) if a relatively long soot filter regeneration process has taken place immediately prior to this. The electronic control unit 4 is a conventional control unit which is readily programmed by one of ordinary skill in the art to control the arrangement as described above.

It is the case for all the embodiments that the battery 16 can also be charged up via a connection to an external power supply (alternating current mains, solar current, etc.).

In a further development of the invention, it is also conceivable to provide an additional electric motor which can be operated as a generator and can be driven for example by the crankshaft or by an exhaust gas turbine arranged in the exhaust gas line of the diesel engine. In the generator mode, this electric motor can also be load-controlled in accordance with the method according to the invention. The current generated can serve both for charging the battery and also for supplying the other electric motor.

The embodiment with two electric machines in the power train permits both machines to operate as a generator, one machine to operate as a generator and the other to operate as a driving electric motor, both or one of the two to operate as a motor in order to support the driving performance of the internal combustion engine, or permits an electric motor to serve as the only travel drive.

The electric motor (electric motor 2 in FIG. 1) located on the gear shaft makes it more difficult to synchronize the gear input shaft when changing gears due to its inertia. This can be remedied by means of electromotive forces during synchronization and/or a clutch can be provided between the gear shaft and the electric motor.

The electric machines can be arranged both concentrically with respect to the crankshaft or gear shaft or else offset laterally with respect thereto, in which case the electric machines are connected to the power train by a lateral drive.

In all of the embodiments of the present invention, it is not absolutely necessary to provide a diesel engine as internal combustion engine, as an internal combustion engine with compression of the mixture can also be used.

In vehicles with automatic gears, the selection of the gear can be included in the characteristic diagram control, a high gear being selected when the battery is fully charged and a lower gear being selected when the battery is discharged so that the additional load of the generator can be taken up.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for controlling a hybrid drive that drives a vehicle, the hybrid drive including an internal combustion engine and at least one electric motor which can be driven via an electrical energy source, the method comprising the steps:

switching the electric motor over to a generator mode when a present requirement to generate electric energy is present;

operating the internal combustion engine substantially at a torque corresponding to ideal operation of the internal combustion engine with respect to at least one of efficiency and exhaust gas behavior when the internal combustion engine is in operating ranges in which an amount of torque to be output by the internal combustion engine for overcoming instantaneous tractive resistances lies below a torque corresponding to the ideal operation of the internal combustion engine; and using a differential torque between the torque corresponding to the ideal operation and the torque to be output by the internal combustion engine for overcoming the instantaneous tractive resistances to drive the electric motor operated as a generator;

wherein the internal combustion engine is a diesel engine which is coupled to a soot filter via an exhaust gas line, and further comprising the step of controlling the amount of torque taken up by the electric motor operating in the generator mode such that, as a function of operating parameters, exhaust gas temperatures are reached which causes automatic burning off of the soot filter.

2. Method according to claim 1, further comprising controlling the amount of torque taken up by the electric motor operating in generator mode to a set value corresponding to the differential torque.

3. Method according to claim 2, wherein a battery is coupled to the electric motor and is an energy source to drive the electric motor, further comprising the step of operating the internal combustion engine at a torque equal to a set value which is greater than the torque corresponding to ideal operation, whenever the battery is discharged to a severe degree.

4. Method according to claim 1, further comprising controlling the hybrid drive according to a characteristic diagram.

5. Method according to claim 4, wherein a battery is coupled to the electric motor and is an energy source to drive the electric motor, further comprising the step of operating the internal combustion engine at a torque equal to a set value which is greater than the torque corresponding to ideal operation, whenever the battery is discharged to a severe degree.

6. Method according to claim 1, wherein a battery is coupled to the electric motor and is an energy source to drive the electric motor, further comprising the step of operating the internal combustion engine at a torque equal to a set value which is greater than the torque corresponding to ideal operation, whenever the battery is discharged to a severe degree.

7. Method according to claim 1, wherein an automatic transmission is coupled to at least one of the internal combustion engine and the electric motor, and further comprising the step of controlling the transmission such that, with a discharged battery, a low gear is selected.

8. Method according to claim 1, further comprising controlling the amount of torque taken up by the electric motor operating in generator mode to a set value corresponding to the differential torque.

9. Method for controlling a hybrid drive that drives a vehicle, the hybrid drive including an internal combustion engine and at least one electric motor which can be driven via an electrical energy source, the method comprising the steps:

switching the electric motor over to a generator mode when a preset requirement to generate electric energy is present;

operating the internal combustion engine substantially at a torque corresponding to ideal operation of the internal combustion engine with respect to at least one of efficiency and exhaust gas behavior when the internal combustion engine is in operating ranges in which an amount of torque to be output by the internal combustion engine for overcoming instantaneous tractive resistances lies below a torque corresponding to the ideal operation of the internal combustion engine; and using a differential torque between the torque corresponding to the ideal operation and the torque to be output by the internal combustion engine for overcoming the instantaneous tractive resistances to drive the electric motor operated as a generator;

wherein the internal combustion engine is a diesel engine which is coupled to a soot filter via an exhaust gas line, and further comprising the step of controlling the amount of torque taken up by the electric motor operating in the generator mode such that exhaust gas temperatures are constantly reached which causes automatic burning off of the soot filter.

10. Method according to claim 9, further comprising controlling the amount of torque taken up by the electric motor operating in generator mode to a set value corresponding to the differential torque.

11. Method according to claim 10, wherein a battery is coupled to the electric motor and is an energy source to drive the electric motor, further comprising the step of operating the internal combustion engine at a torque equal to a set value which is greater than the torque corresponding to ideal operation, whenever the battery is discharged to a severe degree.

12. Method according to claim 9, further comprising controlling the hybrid drive according to a characteristic diagram.

13. Method according to claim 12, wherein a battery is coupled to the electric motor and is an energy source to drive the electric motor, further comprising the step of operating the internal combustion engine at a torque equal to a set value which is greater than the torque corresponding to ideal operation, whenever the battery is discharged to a severe degree.

14. Method according to claim 9, wherein a battery is coupled to the electric motor and is an energy source to drive the electric motor, further comprising the step of operating the internal combustion engine at a torque equal to a set value which is greater than the torque corresponding to ideal operation, whenever the battery is discharged to a severe degree.

15. Method according to claim 9, wherein an automatic transmission is coupled to at least one of the internal combustion engine and the electric motor, and further comprising the step of controlling the transmission such that, with a discharged battery, a low gear is selected.

16. Method according to claim 9, further comprising controlling the amount of torque taken up by the electric motor operating in generator mode to a set value corresponding to the differential torque.

* * * * *